(12) United States Patent
Hedevang

(10) Patent No.: US 7,077,178 B2
(45) Date of Patent: Jul. 18, 2006

(54) FUEL-DISPENSING NOZZLE INHIBITOR

(75) Inventor: Poul Hedevang, Bonn (DE)

(73) Assignee: Stant Manufacturing Inc., Connersville, IN (US)

( * ) Notice: Subject to any disclaimer, the term of this patent is extended or adjusted under 35 U.S.C. 154(b) by 0 days.

(21) Appl. No.: 11/197,622

(22) Filed: Aug. 4, 2005

(65) Prior Publication Data

US 2006/0032552 A1    Feb. 16, 2006

Related U.S. Application Data

(60) Provisional application No. 60/600,616, filed on Aug. 11, 2004.

(51) Int. Cl.
*B65B 1/04* (2006.01)

(52) U.S. Cl. .................. 141/367; 141/301; 141/350; 220/86.2

(58) Field of Classification Search ............. 141/367, 141/301, 302, 349, 350; 220/86.2, DIG. 33

See application file for complete search history.

(56) References Cited

U.S. PATENT DOCUMENTS

| | | | |
|---|---|---|---|
| 4,034,784 A | 7/1977 | Ball et al. | |
| 4,248,279 A | 2/1981 | Warmbold | |
| 4,687,034 A | 8/1987 | Graiff et al. | |
| 5,212,864 A | 5/1993 | Bates et al. | |
| 5,322,100 A | 6/1994 | Buechler et al. | |
| 5,385,179 A | 1/1995 | Bates et al. | |
| 5,439,129 A | 8/1995 | Buechler | |
| 6,302,169 B1 | 10/2001 | Pulos | |
| 6,382,270 B1 | 5/2002 | Gzik | |
| 6,539,990 B1 * | 4/2003 | Levey et al. | 141/301 |
| 6,607,014 B1 | 8/2003 | Webb | |
| 2002/0020465 A1 | 2/2002 | Gzik | |
| 2002/0170622 A1 | 11/2002 | Webb | |
| 2004/0025967 A1 | 2/2004 | Henry | |
| 2005/0000592 A1 | 1/2005 | Bartlett | |

* cited by examiner

*Primary Examiner*—Steven O. Douglas
(74) *Attorney, Agent, or Firm*—Barnes & Thornburg LLP

(57) ABSTRACT

A nozzle inhibitor is positioned in a filler neck closure assembly between a pivotable outer door and a pivotable inner door to prevent a user from pumping unleaded fuel into a diesel fuel tank. The nozzle inhibitor blocks full insertion of a small-diameter unleaded fuel nozzle into the filler neck closure assembly yet allows full insertion of a large-diameter diesel fuel nozzle into the filler neck closure assembly.

35 Claims, 5 Drawing Sheets

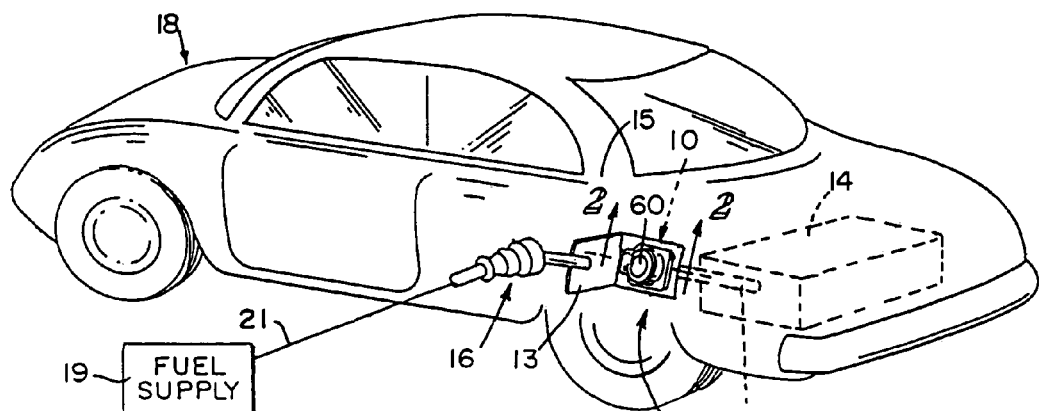
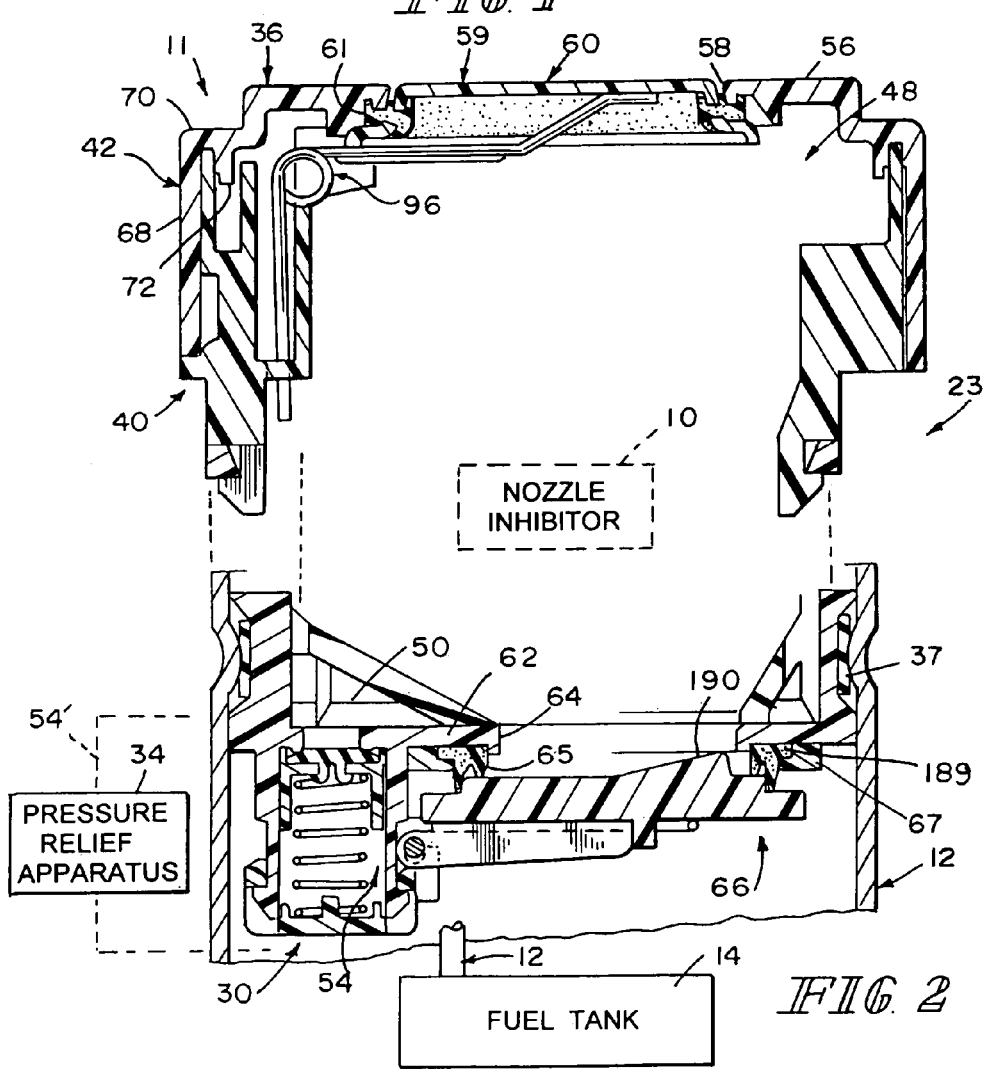

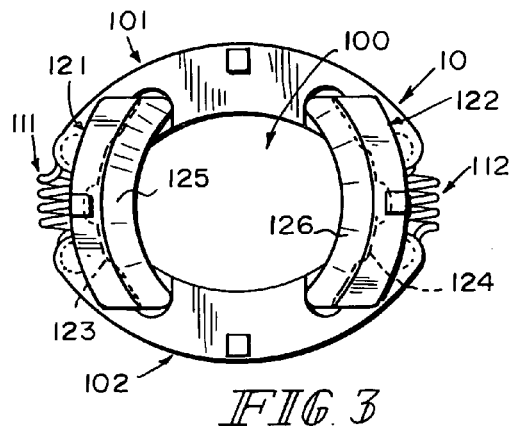
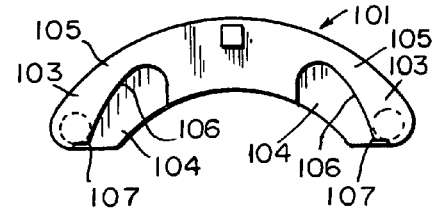
FIG. 3
FIG. 5
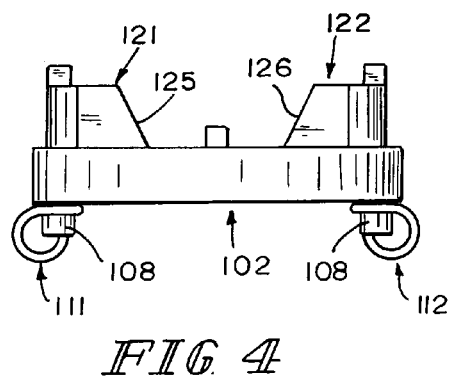
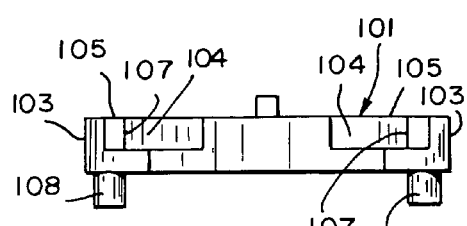
FIG. 4
FIG. 6
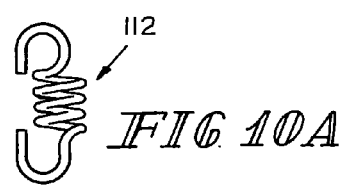
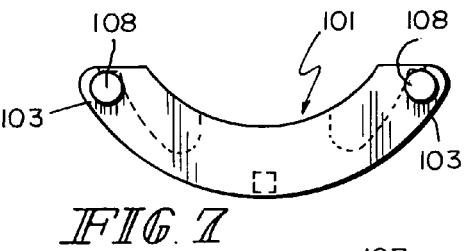
FIG. 10A
FIG. 7
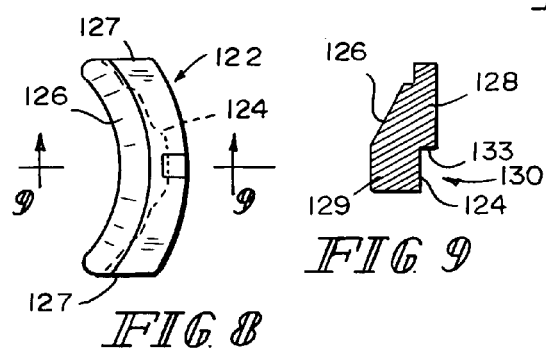
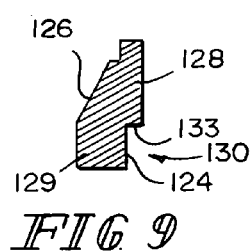
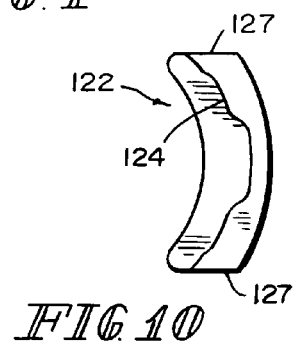
FIG. 8
FIG. 9
FIG. 10

FUEL-DISPENSING NOZZLE INHIBITOR

This application claims priority under 35 U.S.C. § 119(e) to U.S. Provisional Application Ser. No. 60/600,616, filed Aug. 11, 2004, which is expressly incorporated by reference herein.

BACKGROUND

The present disclosure relates to a fuel tank fill tube, and more particularly to a device for preventing the introduction of a nozzle for unleaded fuel into the fill tube of a fuel tank of a motor vehicle fitted with a diesel internal combustion engine.

Unleaded fuel should not be introduced into a fill tube of a motor vehicle powered by a diesel engine. It is customary to use a small-diameter fuel-dispensing nozzle (e.g., 22 mm or less) to dispense unleaded fuel into a fuel tank fill tube and to use a large-diameter fuel-dispensing nozzle (e.g., 26 mm or more) to dispense diesel and leaded fuel into a fuel tank fill tube.

SUMMARY

A nozzle inhibitor is configured to be coupled to a fuel tank fill tube and arranged to allow only a diesel fuel nozzle having an outer diameter that is greater than a specified minimum diameter to be inserted into the fill tube to a depth sufficient so that a user may dispense diesel fuel from that nozzle into a diesel fuel tank coupled to the fill tube. Such a nozzle inhibitor inhibits insertion of a small-diameter unleaded fuel nozzle into the fill tube of a diesel fuel tank, yet allows a large-diameter diesel fuel nozzle to be inserted into the fill tube of the diesel fuel tank.

In illustrative embodiments, the fill tube includes a filler neck coupled to the diesel fuel tank and a filler neck closure assembly coupled to the filler neck. The nozzle inhibitor is mounted inside the filler neck closure assembly. For example, the nozzle inhibitor is interposed in a space provided in the filler neck closure assembly between a pivotable outer appearance door and a pivotable inner flapper door.

In illustrative embodiments, the nozzle inhibitor includes a pair of blocking members and a pair of activator members coupled to the blocking members. Each blocking member is movable in a direction generally perpendicular to a longitudinal axis of the fill tube between an initial position blocking insertion of the small-diameter unleaded fuel nozzle into the filler neck closure assembly and a retracted position allowing insertion of the large-diameter diesel fuel nozzle into the filler neck closure assembly. Each blocking member is moved to the retracted position in response to the insertion of the large-diameter diesel fuel nozzle (but not the small-diameter unleaded fuel nozzle) into the filler neck closure assembly to engage and move the activator members so that the large diameter diesel nozzle fuel nozzle is free to move past the retracted blocking members to reach and move the inner flapper door from a normally closed position to an opened position. A pump operator can now use the diesel fuel nozzle to pump diesel fuel into the diesel fuel tank.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the following figures in which:

FIG. 1 is a perspective view showing an outer filler neck access door moved to an opened position relative to a vehicle body panel to expose an illustrative filler neck closure assembly coupled to a filler neck leading to a vehicle fuel tank and showing a fuel-dispensing pump nozzle coupled to a fuel supply and configured to be inserted into the filler neck closure assembly during vehicle refueling to discharge liquid fuel into the filler neck leading to the vehicle fuel tank;

FIG. 2 is a sectional view of the filler neck taken along line 2—2 of FIG. 1 showing an outer appearance door and an inner flapper door in their unpivoted, sealed, closed positions and showing a nozzle inhibitor interposed between the outer appearance door and the inner flapper door and configured to block movement of a small-diameter unleaded fuel nozzle through the filler neck closure assembly to engage the inner flapper door yet allow movement of a large-diameter diesel fuel nozzle through the filler neck closure assembly to pivot the inner flapper door to an opened position so that a user can operate the nozzle to dispense fuel through the filler neck into the fuel tank;

FIG. 3 is a top plan view of a nozzle inhibitor in accordance with a first embodiment of the disclosure and showing a pair of springs interposed between a pair of blocking plates, a first activator plate arranged to lie alongside one of the springs and coupled to left-side portions of the two blocking plates, and a second activator plate arranged to lie alongside the other of the springs (in spaced-apart relation to the first activator plate) and coupled to right-side portions of the two blocking plates;

FIG. 4 is a front elevation view of the nozzle inhibitor of FIG. 3;

FIG. 5 is a top plan view of one of the blocking plates illustrated in FIGS. 3 and 4;

FIG. 6 is a front elevation view of the blocking plate of FIG. 5;

FIG. 7 is a bottom view of the blocking plate of FIGS. 5 and 6;

FIG. 8 is a top plan view of one of the activator plates illustrated in FIGS. 3 and 4;

FIG. 9 is a sectional view taken along line 9—9 of FIG. 8;

FIG. 10 is a bottom view of the activator plate of FIG. 8;

FIG. 10A is a top plan view of one of the springs illustrated in FIGS. 3 and 4;

DETAILED DESCRIPTION

Figures 11, 13:
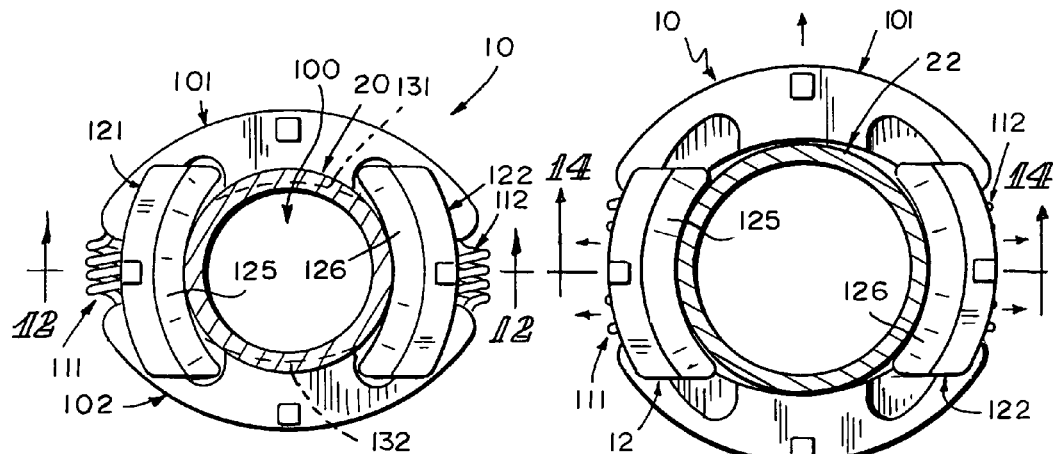
FIG. 11 is a view similar to FIG. 3 showing a small-diameter unleaded fuel nozzle inserted into a space provided between the two activator plates and arranged to abut a small crescent-shaped nozzle-blocking surface on each of the two blocking plates.
FIG. 13 is a view similar to FIG. 11 showing a large-diameter diesel fuel nozzle inserted into the space provided between the two activator plates to move the activator plates away from one another, which movement causes the blocking plates to move away from one another and stretch the springs.

A nozzle inhibitor 10 is associated with a fill tube 23 coupled to a vehicle fuel tank 14 as suggested in FIGS. 1 and 2 to prevent a fuel-purchasing customer from using a fuel-dispensing pump nozzle 16 to discharge unleaded fuel into a vehicle 18 having a diesel engine (not shown) requiring only diesel fuel. In accordance with a first embodiment of the disclosure, nozzle inhibitor 10 is configured to block full insertion of a small-diameter unleaded fuel nozzle 20 into fill tube 23 as suggested in FIGS. 11 and 12. However, nozzle inhibitor 10 is configured to allow full insertion of a large-diameter diesel fuel nozzle 22 into fill tube 23 as suggested in FIGS. 13 and 14. In accordance with a second embodiment of the disclosure, full insertion of small-diameter unleaded fuel nozzle 20 into fill tube 23 is blocked by a nozzle inhibitor 210 as suggested in FIG. 16, while full insertion of large-diameter diesel fuel nozzle 22 into fill tube 23 is allowed by nozzle inhibitor 210 as suggested in FIG. 17. Large-diameter diesel fuel nozzle 22 has an outer diameter that is relatively larger than the outer diameter of small-diameter unleaded fuel nozzle 20.

As used in the specification and claims, the terms "unleaded fuel nozzle," "non-diesel fuel nozzle," and "small-diameter nozzle" are used interchangeably, and the meaning of one term broadly covers the meaning of the other terms. The terms "diesel fuel nozzle," "leaded fuel nozzle" and "large-diameter nozzle," are also used interchangeably, and the meaning of one term broadly covers the meaning of the other terms. As used in the specification and claims, the terms "further insertion" and "full insertion" mean insertion of pump nozzles 16, 20, 22 past blocking plates 101, 102 in the embodiment of FIGS. 3–14 and past blocking plates 201, 202 in the embodiment of FIGS. 15–17.

As shown in FIG. 1, fill tube 23 includes a filler neck 12 coupled to fuel tank 14 and a filler neck closure assembly 11 coupled to filler neck 12. In the illustrated embodiments, filler neck closure assembly 11 contains nozzle inhibitor 10. However, nozzle inhibitor 10 may very well be mounted directly in filler neck 12. During refueling, an outer filler neck access door 13 is moved relative to a vehicle body panel 15 to expose filler neck closure assembly 11 as shown, for example, in FIG. 1. Filler neck closure assembly 11 is located in a chamber 17 formed in vehicle 18 so that assembly 11 is "out of sight" when outer access door 13 is closed. Fuel-dispensing pump nozzle 16 is coupled to a fuel supply 19 by a hose 21 and configured to be inserted into filler neck closure assembly 11 during vehicle refueling to discharge liquid fuel into filler neck 12.

Filler neck closure assembly 11 is assembled as shown, for example, in FIG. 2. Reference is hereby made to U.S. patent application Ser. No. 10/895,593, filed on Jul. 21, 2004 and titled "Closure and Vent System for Capless Filler Neck," which application is hereby incorporated by reference herein, for further details about the configuration and function of filler neck closure assembly 11. In the illustrated embodiment, a vacuum-relief apparatus 30 is included in assembly 11 to provide means for admitting ambient air into filler neck 12 whenever certain predetermined vacuum conditions develop in fuel tank 14 and filler neck 12. Assembly 11 may include a pressure-relief apparatus 34 (alone or in tandem with vacuum-relief apparatus 30) to discharge excess pressurized fuel vapor from filler neck 12 through assembly 11 to the surroundings.

As suggested in FIG. 2, filler neck closure assembly 11 includes a housing 36 adapted to be coupled to a mouth of filler neck 12 in the manner shown, for example, in FIG. 2. A sealing gasket 37 is interposed between housing 36 and filler neck 12 to establish a sealed connection therebetween.

In the illustrated embodiment, housing 36 comprises a base 38, an outer body 40 coupled to base 38, and an outer shell 42 coupled to outer body 40. Outer shell 42 includes a top wall 56, an annular skirt 68, and an L-shaped upper portion 70 interconnecting top wall 56 and annular skirt 68. Means 72 is appended to an underside of upper portion 70 for coupling outer shell 42 to outer body 40.

As suggested in FIG. 2, housing 36 also includes a vent passage 54 and/or 54' having an outer end opening into an inner vent chamber 50 located in interior region 48 and an inner end adapted to open into fuel tank filler neck 12 when housing 36 is coupled to filler neck 12. A flow control valve assembly such as vacuum-relief apparatus 30 or pressure-relief apparatus 34 can be placed in vent passage 54 or 54' to regulate the flow of gas (e.g., air or fuel vapor) through vent passage 54 of 54'.

Housing 36 is adapted to be coupled to fuel tank filler neck 12 to receive pump nozzles 16, 20, 22 during refueling of fuel tank 14. Top wall 56 is formed to include an outer nozzle-receiving aperture 58 normally closed by an outer closure 60. As suggested in FIGS. 2, outer closure 60 includes an outer appearance door 59 mounted for pivotable movement relative to outer body 40 and a seal member 61 carried by outer appearance door 59. Outer appearance door 59 is configured to be moved (e.g., pivoted) by pump nozzles 16, 20, 22 to assume an opened position during refueling. A torsion spring 96 is provided to bias outer appearance door 59 normally and yieldably to the closed position. When outer closure 60 is moved to assume the closed position, outer appearance door 59 occludes outer nozzle-receiving aperture 58 and seal member 61 establishes a sealed connection between outer appearance door 59 and top wall 56 of outer shell 42.

Housing 36 includes a bottom wall 62 provided, for example, on base 38 and formed to include an inner nozzle-receiving aperture 64 normally closed by an inner flapper door 66. Flapper door 66 is arranged to be moved (e.g., pivoted) by large-diameter diesel fuel nozzle 22 (but not by small-diameter unleaded fuel nozzle 20) to assume an opened position during refueling operation. As also suggested in FIG. 2, an annular seal 65 is configured to mate with flapper door 66 upon movement of flapper door 66 to the closed position. A torsion spring (not shown) is provided to bias flapper door 66 normally and yieldably to the closed position. A seal retainer 67 is coupled (e.g., welded) to base 38 to retain annular seal 65 in a position surrounding inner nozzle-receiving aperture 64 and engaging flapper door 66 upon movement of flapper door 66 to assume the closed position.

Nozzles 16, 20, or 22 are movable through outer nozzle-receiving aperture 58 to move outer appearance door 59 to an opened position and then though pump nozzle-receiving passageway 48 formed in an interior region of housing 36. In addition, in the case of large-diameter diesel fuel nozzle 22, large-diameter diesel fuel nozzle 22 is movable through pump nozzle-receiving passageway 48 and then through inner nozzle-receiving aperture 64 to move inner flapper door 66 to an opened position during fuel tank refueling.

In accordance with a first embodiment of this disclosure illustrated in FIGS. 3–14, nozzle inhibitor 10 includes first and second blocking plates (or members) 101, 102, first and second springs 111, 112 interposed between first and second blocking plates 101, 102, a first activator plate (or member) 121 arranged to lie alongside first spring 111 and coupled to left-side portions of first and second blocking plates 101, 102 (as best shown in FIGS. 3, 11, and 13) and a second activator plate (or member) 122 arranged to lie alongside second spring 112 and coupled to right-side portions of first and second blocking plates 101, 102 (also, as best shown in FIGS. 3, 11, and 13).

In the illustrated embodiment, nozzle inhibitor 10 is integrated into filler neck 12 to inhibit use of small-diameter unleaded fuel nozzle 20 to discharge unleaded fuel into fuel tank 14 of vehicle 18 having a diesel engine. However, it is within the scope of this disclosure to mount nozzle inhibitor 10 directly in filler neck 12. In the illustrated embodiment, blocking plates 101, 102 are identical, springs 111, 112 are identical, and activator plates 121, 122 are identical. It is within the scope of this disclosure to use non-identical blocking plates, springs, and activator plates.

As suggested, for example, in FIGS. 5–7, each blocking plate 101, 102 has a generally arcuate foot print having spaced-apart end portions 103. Each end portion 103 is formed to include an upwardly and inwardly-opening cutout 104 defining an upwardly-facing ledge portion 105 and an inwardly-facing wall 106. Each inwardly-facing wall 106 is formed to include an outwardly-projecting rib portion 107. A post 108 extends downwardly from an underside of each end portion 103 as suggested, for example, in FIG. 4. The ends of springs 111, 112 are configured to loop around downwardly-extending posts 108 of blocking plates 101, 102 as suggested, for example, in FIGS. 3 and 4.

As suggested, for example, in FIGS. 8–10, each activator plate 121, 122 has a generally arcuate foot print having spaced apart end portions 127. Each activator plate 121, 122 is formed to include an upwardly-extending portion 128 defining an upwardly and inwardly-facing inclined cam surface 125, 126 (FIG. 3) and a downwardly-extending portion 129 having a downwardly and outwardly-opening cutout 130 defining a downwardly-facing seat portion 133 and an outwardly-facing and inwardly-offset guide wall 123, 124 (FIG. 3).

As suggested, for example, in FIGS. 3, 4 and 11-14, when assembled, downwardly-facing seat portions 133 of activator plates 121, 122 rest against upwardly-facing ledge portions 105 of blocking plates 101, 102, end portions 127 of activator plates 121, 122 rest against inwardly-facing walls 106 of cutouts 104 in blocking plates 101, 102, outwardly-facing guide walls 123, 124 of activator plates 121, 122 rest against rib portions 107 of blocking plates 101, 102, and springs 111, 112 yieldably bias blocking plates 101, 102 and activator plates 123 and 124 to assume their respective initial or home positions as suggested, for example, in FIG. 3.

Figures 12, 14:
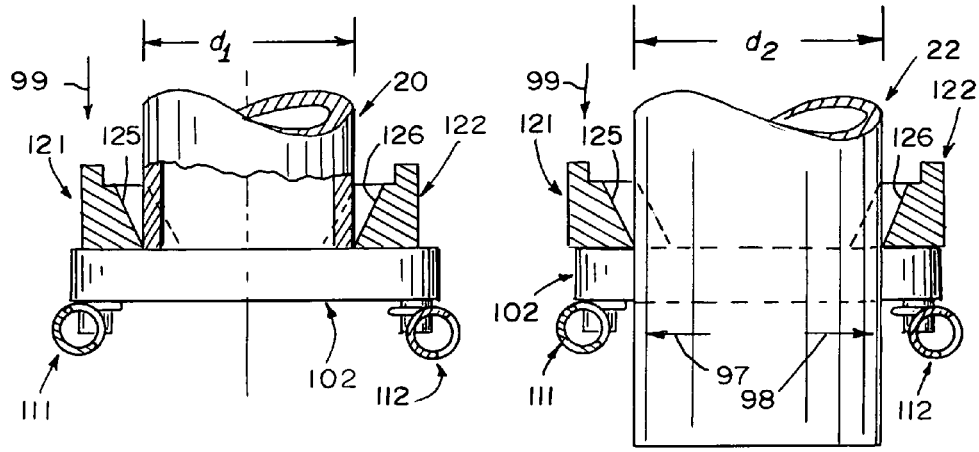
FIG. 12 is a sectional view taken along line 12—12 of FIG. 11 showing engagement of a tip of the small-diameter unleaded fuel nozzle against one of the blocking plates to block further movement of the nozzle through the space provided between the two blocking plates.
FIG. 14 is a sectional view taken along line 14—14 of FIG. 13 showing movement of the large-diameter diesel fuel nozzle through the space provided between the two activator plates and past the nozzle-blocking surfaces provided on the blocking plates.

In operation, as suggested in FIGS. 11 and 12, blocking plates 101, 102 reduce the inside diameter of a nozzle entrance port 100 bounded by plates 101, 102, 121, and 122 to a size that is less than the size of prohibited small-diameter unleaded fuel nozzle 20 having an outer diameter $d_1$ that is about 22 mm or less as suggested, for example, in FIGS. 11 and 12. In this case, when unauthorized small-diameter unleaded fuel nozzle 20 is inserted into a space provided between first and second activator plates 121, 122, a tip of that nozzle 20 is arranged to abut a small crescent-shaped nozzle-blocking surface 131 on first blocking plate 101 and a small crescent-shaped nozzle-blocking surface 132 on second blocking plate 102. Such engagement provides means for blocking further movement of small-diameter unleaded fuel nozzle 20 in direction 99 into filler neck 12. Thus, small-diameter nozzle 20 is never able to reach and pivot inner flapper door 66 to an opened position because nozzle inhibitor 10 is interposed between outer appearance door 59 and inner flapper door 66. Therefore, any attempt to insert unauthorized smaller-diameter nozzle 20 to a fuel-discharge position in fuel tank filler neck 12 will be stopped by blocking plates 101, 102.

As suggested in FIGS. 13 and 14, movement of large-diameter diesel fuel nozzle 22 in an inward direction 99 will cause a tip of diesel fuel nozzle 22 to engage cam surfaces 125, 126 on activator plates 121, 122 and move activator plates 121, 122 away from one another. First activator plate 121 will move in direction 97 against a biasing force generated by first spring 111. Second activator plate 122 will move in an opposite direction 98 against a biasing force generated by second spring 112. Diesel fuel nozzle 22 has an outer diameter $d_2$ that is greater than the outer diameter $d_1$ of unleaded fuel nozzle 20 and is sized to cause the tip of diesel fuel nozzle 22 to engage both of cam surfaces 125, 126 as diesel fuel nozzle 22 is moved in direction 99 toward nozzle entrance port 100 bounded by plates 101, 102, 121, and 122. As large-diameter diesel fuel nozzle 22 causes activator plates 121, 122 to spread apart, activator plates 121, 122, in turn, cause blocking plates 101, 102 to spread apart to allow large-diameter diesel fuel nozzle 22 to proceed further into filler neck closure assembly 11 toward inner flapper door 66 as suggested in FIGS. 13 and 14.

The characteristic of the retraction, i.e., the movement of activator plates 121, 122 relative to blocking plates 101, 102, is defined by the shape of guide walls 123, 124 on activator plates 121, 122 as suggested, for example, in FIGS. 3, 8, and 10. It is within the scope of this disclosure to provide guide walls 123, 124 on blocking plates 101, 102 instead of activator plates 121, 122. The gradient of inclined cam surfaces 125, 126 on activator plates 121, 122 is responsible for the relation between the depth of insertion of large-diameter diesel fuel nozzle 22 and the corresponding outward movements of activator plates 121, 122 and blocking plates 101, 102.

If a pump nozzle operator tries to slide only one of blocking plates 101, 102 by pushing small-diameter unleaded fuel nozzle 20 to one side, two activator plates 121, 122 will tend to twist about respective generally vertical axes. However, the means supporting blocking plates 101, 102 and activator plates 121, 122 in housing 36 of filler neck closure assembly 11 will resist the twisting movement of activator plates 121, 122 caused by any attempt to slide only one of blocking plates 101, 102 to one side, thereby preventing insertion small-diameter unleaded fuel nozzle 20 through nozzle entrance port 100.

In the illustrated embodiment, filler neck closure assembly 11 provides a housing for nozzle inhibitor 10 as suggested in FIG. 2. It is within the scope of this disclosure to mount nozzle inhibitor 10 either in filler neck closure assembly 11 (which incorporates other features like outer appearance door 59, inner flapper door 66, vacuum-relief valve 30, pressure-relief valve 34, sealing gaskets 37, 61, 65, etc.) or in filler neck 12. A simple mounting bracket or plate may be used for supporting blocking plates 101, 102 and activator plates 121, 122 in filler neck colure assembly 11 or in filler neck 12. The means for supporting blocking plates 101, 102 and activator plates 121, 122 allows them to move in two mutually perpendicular directions that are generally perpendicular to the direction of insertion of nozzles 16, 20, 22 into filler neck 12 and, at the same time, limit their movement to these two directions only.

Figure 15:
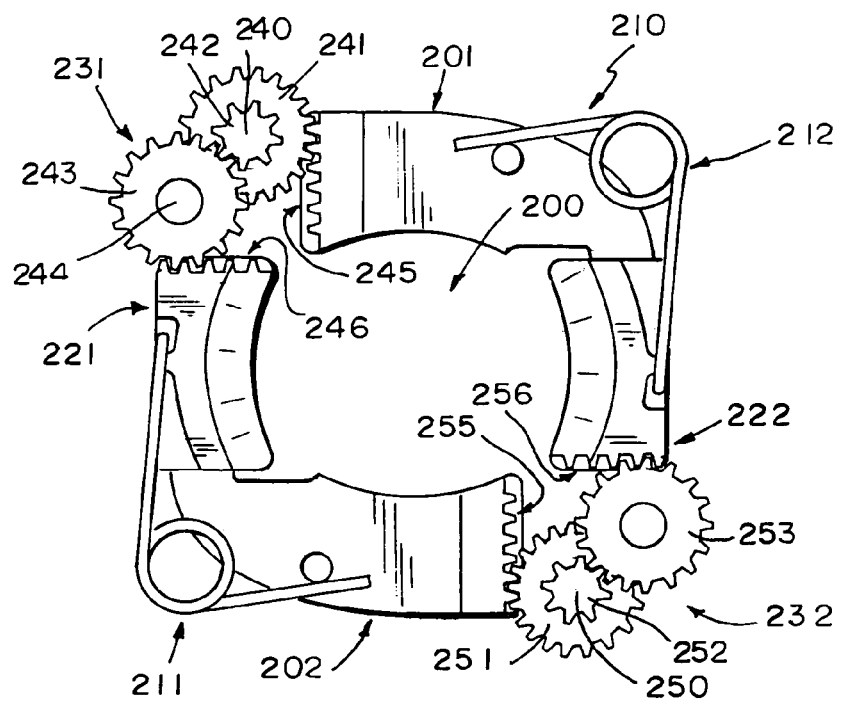
FIG. 15 is a top plan view of a nozzle inhibitor in accordance with a second embodiment of this disclosure and showing a spaced-apart pair of short activator plates, a spaced-apart pair of longer blocking plates, a first gear set arranged to engage racks provided on a first set of plates, a second gear set arranged to engage racks provided on a second set of plates, a first biasing spring coupled to an activator plate in the first set of plates and to a blocking plate in the second set of plates, and a second biasing spring coupled to an activator plate in the second set of plates and to a blocking plate in the first set of plates.
Figure 16:
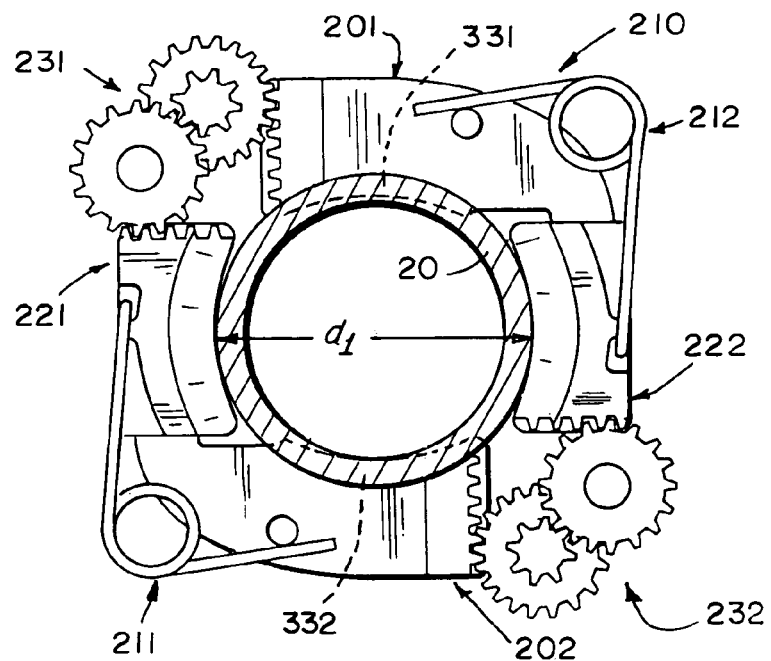
FIG. 16 is a view similar to FIG. 15 showing a small-diameter unleaded fuel nozzle inserted into a space provided between the two short activator plates and arranged to abut a small crescent-shaped nozzle-blocking surface on each of the two longer blocking plates.
Figure 17:
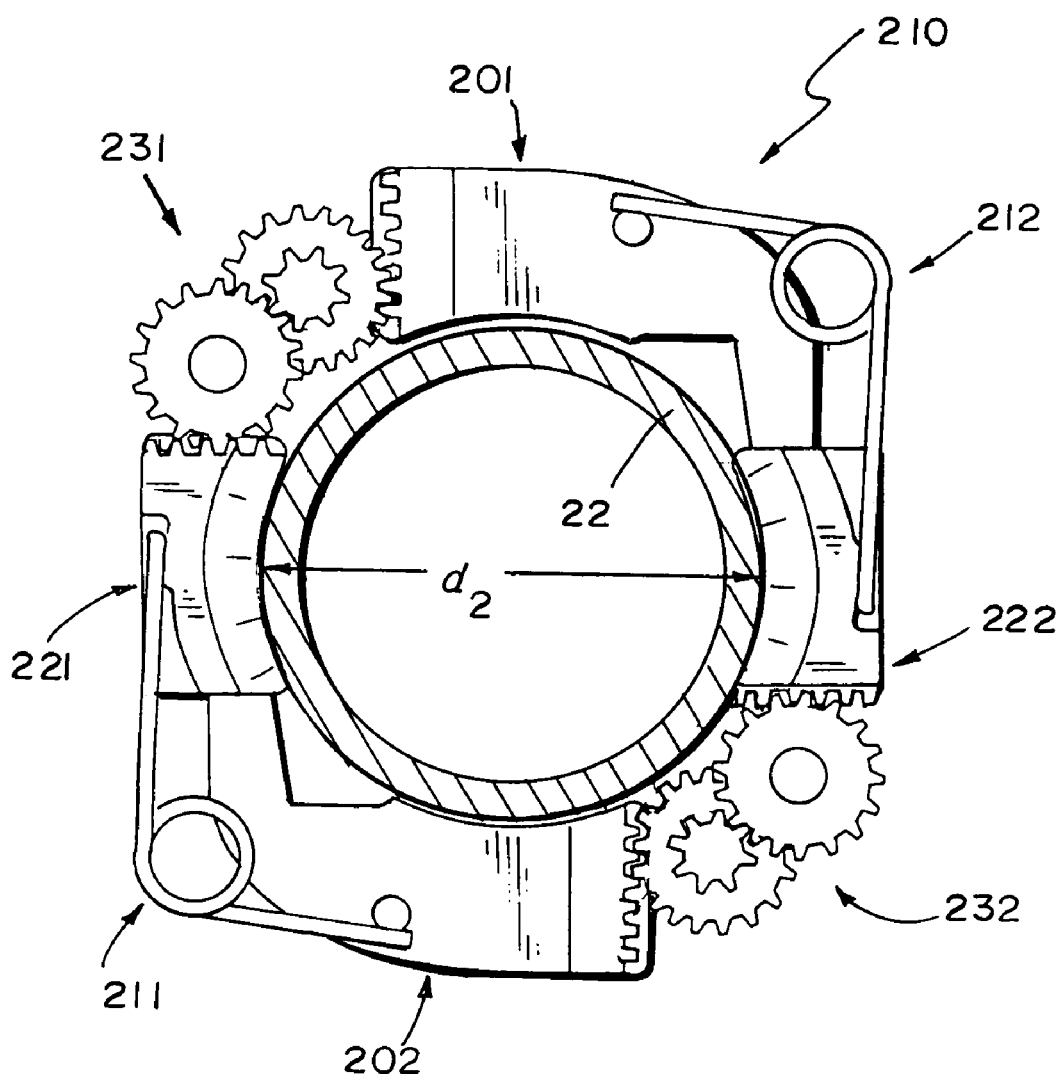
FIG. 17 is a view similar to FIG. 1 showing a large-diameter diesel fuel nozzle inserted into the space provided between the two short activator plates to move the activator plates away from one another, which movement causes the longer blocking plates to move away from one another (against biasing forces provided by the springs) to allow movement of the large-diameter diesel fuel nozzle past the nozzle-blocking surfaces provided on the blocking plates and through the now-wider space provided between the blocking plates.

In accordance with a second embodiment of this disclosure illustrated in FIGS. 15–17, a nozzle inhibitor 210 includes first and second blocking plates 201, 202, first and second springs 211, 212, first and second activator plates 221, 222, and first and second wheel sets 231, 232. Like nozzle inhibitor 10, nozzle inhibitor 210 can be integrated either into filler neck closure assembly 11 or filler neck 12 to inhibit use of small-diameter unleaded fuel nozzle 20 to discharge unleaded fuel into a fuel tank 14 of a vehicle 18 fitted with a diesel engine. First spring 211 is interposed between first activator plate 221 and second blocking plate 202. Second spring 211 is interposed between second activator plate 222 and first blocking plate 201. In the illustrated embodiment, blocking plates 201, 202 are identical, springs 211, 212 are identical, activator plates 221, 222 are identical, and wheel sets 231, 232 are identical. It is within the scope of this disclosure to use non-identical blocking plates, springs, activator plates, and wheel sets.

In the illustrated embodiment, first wheel set 231 includes a first wheel 241 mounted for rotation about an axis 240 and configured to carry a second wheel 242 that also rotates about axis 240. First wheel set 231 also includes a third wheel 243 mounted for rotation about an axis 244. First wheel 241 mates with blocking plate 201 and third wheel 243 mates with activator plate 221 and second wheel 242. In the illustrated embodiment, wheels 241, 242, and 243 are gears, and the gear teeth on first wheel 241 mesh with a toothed rack 245 provided on blocking plate 201 while the gear teeth on third wheel 243 mesh with a toothed rack 246 provided on activator plate 221 and with the teeth provided on second wheel 242. In an alternative embodiment, frictional engagement is established between the mating wheels on the plates to cause blocking plate 201 to move as suggested in FIG. 17 in response to the outward movement of activator plate 221.

In the illustrated embodiment, second wheel set 232 includes a first wheel 251 mounted for rotation about an axis 250 and configured to carry a second wheel 252 that also rotates about axis 250. Second wheel set 232 also includes a third wheel 253 mounted for rotation about an axis 254. Second wheel 251 mates with blocking plate 202 and third wheel 253 mates with activator plate 222 and second wheel 252. In the illustrated embodiment, wheels 251, 252, and 253 are gears, and the gear teeth on first wheel 251 mesh with a toothed rack 255 provided on blocking plate 202 while the gear teeth on third wheel 253 mesh with a toothed rack 256 provided on activator plate 222 and with the teeth provided on second wheel 252. In an alternative embodiment, frictional engagement is established between the mating wheels and the plates to cause blocking plate 202 to move as suggested in FIG. 17 in response to the outward movement of activator plate 222.

In operation, as suggested in FIG. 16, blocking plates 201, 202 are arranged to reduce the size of a nozzle entrance port 200 bounded by plates 201, 202, 221, and 222 to a size that is less than the size of prohibited small-diameter unleaded fuel nozzle 20 having a diameter $d_1$ that is about 22 mm or less. In this case, when unauthorized small-diameter unleaded fuel nozzle 20 is inserted into a space provided between first and second activator plates 221, 222, a tip of that nozzle is arranged to abut a small crescent-shaped nozzle-blocking surface 331 on first blocking plate 201 and a small crescent-shaped nozzle-blocking surface 332 on second blocking plate 202. Such engagement provides means for blocking further movement of nozzle 20 into nozzle entrance port 200. Thus, small-diameter unleaded fuel nozzle 20 is never able to pass through nozzle entrance port 200. Therefore, any attempt to insert unauthorized small-diameter unleaded fuel nozzle 20 to a fuel-discharge position in a fuel tank filler neck 12 will be stopped by blocking plates 201, 202.

In operation, as suggested in FIG. 17, insertion of authorized large-diameter diesel fuel nozzle 22 into nozzle inhibitor 210 will cause activator plates 221, 222 to spread apart. Such movement will turn first wheels 241, 251 to turn third wheels 243, 253 to cause blocking plates 201, 202 to retract (i.e., spread apart) to allow further movement of large-diameter diesel fuel nozzle 22 toward inner flapper door 66 through expanded nozzle entrance port 200.

The characteristic of the retraction, i.e., the movement of activator plates 221, 222 relative to blocking plates 201, 202, is defined by the gear ratio of first and third gears in each wheel set 231, 232. As in the first embodiment, the gradient on cam ramps 225, 226 is responsible for the relation between the depth of insertion of large-diameter diesel fuel nozzle 22 and the corresponding movement of activator plates 221, 222 and blocking plates 201, 202.

If a pump nozzle operator tries to slide only one of blocking plates 201, 202 by pushing small-diameter unleaded fuel nozzle 20 to one side, two activator plates 221, 122 will resist the movement of one blocking plate 201, 202, thereby preventing insertion small-diameter unleaded fuel nozzle 20 through nozzle entrance port 200.

In the illustrated embodiment, filler neck closure assembly 11 provides a housing for nozzle inhibitor 210 as suggested in FIG. 2. It is within the scope of this disclosure to mount nozzle inhibitor 210 either in filler neck closure assembly 11 (which incorporates other features like outer appearance door 59, inner flapper door 66, vacuum-relief valve 30, pressure-relief valve 34, sealing gaskets 37, 61, 65, etc.) or in filler neck 12. A simple mounting bracket or plate may be used for supporting blocking plates 201, 202 and activator plates 221, 222 in filler neck closure assembly 11 or in filler neck 12. Means for supporting blocking plates 201, 202 and activator plates 221, 222 allows them to move in two mutually perpendicular directions that are generally perpendicular to the direction of insertion of nozzles 16, 20, 22 into filler neck 12 and, at same time, limit their movement to these two directions only.

The invention claimed is:

1. A nozzle inhibitor apparatus comprising
a fill tube adapted to be coupled to a fuel tank of a motor vehicle having a diesel engine and
means for preventing insertion of a small-diameter unleaded fuel nozzle into the fill tube while allowing insertion of a large-diameter diesel fuel nozzle into the fill tube, the preventing means including
at least one blocking member positioned in the fill tube and movable in a direction generally perpendicular to a longitudinal axis of the fill tube between a first position blocking insertion of the unleaded fuel nozzle into the fill tube past the at least one blocking member and a second position allowing insertion of the diesel fuel nozzle into the fill tube past the at least one blocking member, and
at least one activator member positioned in the fill tube and operable to move the at least one blocking member to the second position in response to the insertion of the diesel fuel nozzle, but not the unleaded fuel nozzle, into the fill tube.

2. The apparatus of claim 1, wherein the fill tube includes a filler neck coupled the fuel tank and a filler neck closure assembly coupled to the filler neck, the filler neck closure assembly includes a housing having an outer nozzle-receiving aperture normally closed by a pivotable outer door and an inner nozzle-receiving aperture normally closed by a pivotable inner door, and the at least one blocking member and the at least one activator member are located in the filler neck closure assembly in positions between the pivotable outer door and the pivotable inner door.

3. The apparatus of claim 1, wherein the at least one blocking member includes a pair of spaced-apart blocking members, and further comprising a pair of spaced-apart biasing springs interposed between the pair of spaced-apart blocking members, wherein the at least one activator member includes a pair of spaced-apart activator members, a first one of the pair of spaced-apart activator members is located alongside a first one of the biasing springs and coupled to left-side portions of the blocking members, and a second one of the pair of spaced-apart activator members is located alongside a second one of the pair of spaced-apart biasing springs and coupled to right-side portions of the pair of spaced-apart blocking members.

4. The apparatus of claim 3, wherein the blocking members and the activator members are movable toward and away from each other between their respective first positions and respective second positions, and the biasing springs yieldably bias the blocking members and the activator members to assume their respective first positions.

5. The apparatus of claim 3, wherein, when a large-diameter diesel fuel nozzle is inserted into a space provided between the two activator members to move the activator members away from one another, the blocking members move away from one another against the biasing springs to allow movement of the large-diameter diesel fuel nozzle past nozzle-blocking surfaces provided on the blocking members.

6. The apparatus of claim 3, wherein each blocking member has a generally arcuate foot print having spaced-apart end portions, each end portion is formed to include an upwardly and inwardly-opening cutout defining an upwardly-facing ledge portion and an inwardly-facing wall, each inwardly-facing wall is formed to include an outwardly-projecting rib portion, a post extends downwardly from an underside of each end portion, and the ends of biasing springs are configured to loop around downwardly-extending posts of blocking members.

7. The apparatus of claim 6, wherein each activator member has a generally arcuate foot print having spaced apart end portions, and each activator member is formed to include an upwardly-extending portion defining an upwardly and inwardly-facing inclined cam surface and a downwardly-extending portion having a downwardly and outwardly-opening cutout defining a downwardly-facing seat portion and an outwardly-facing and inwardly-offset guide wall.

8. The apparatus of claim 7, wherein, when assembled, the downwardly-facing seat portions of the activator members rest against the upwardly-facing ledge portions of the blocking members, the end portions of the activator members rest against the inwardly-facing walls of the cutouts in the blocking members, the outwardly-facing guide walls of the activator members rest against the rib portions of the blocking members, and the bias springs yieldably bias the blocking members and the activator members to assume their respective first positions.

9. The apparatus of claim 7, wherein movement of the large-diameter diesel fuel nozzle in an inward direction toward a nozzle entrance port bounded by the blocking and activator members causes a tip of the large-diameter diesel fuel nozzle to engage the inclined cam surfaces on the activator members and move the activator members away from one another against the biasing springs, and the activator members, in turn, cause the blocking members to spread apart to allow the large-diameter diesel fuel nozzle to proceed further into the fill tube past the blocking members.

10. The apparatus of claim 7, wherein movement of the blocking members relative to the activator members is defined by the shape of the guide walls on the activator members and the gradient of the inclined cam surfaces on the activator members is responsible for the relation between the depth of insertion of the large-diameter diesel fuel nozzle into the fill tube and corresponding outward movements of the activator members and the blocking members.

11. The apparatus of claim 1, wherein the at least one blocking member includes a spaced-apart pair of longer blocking members, the at least one activator member includes a spaced-apart pair of short activator members, a first gear set arranged to engage racks provided on a first set of members, a second gear set arranged to engage racks provided on a second set of members, and further comprising a pair of spaced-apart biasing springs, and wherein a first one of the pair of spaced-apart biasing springs is coupled to an activator member in the first set of members and to a blocking member in the second set of members, and a second one of the pair of spaced-apart biasing springs is coupled to an activator member in the second set of members and to a blocking member in the first set of members.

12. The apparatus of claim 11, wherein, when a large-diameter diesel fuel nozzle is inserted into a space provided between the short activator members to move the short activator members away from one another, the longer blocking members move away from one another against the biasing springs to allow movement of the large-diameter diesel fuel nozzle past nozzle-blocking surfaces provided on the longer blocking members and through a space provided between the longer blocking members.

13. The apparatus of claim 1, wherein the at least one blocking member comprises a pair of spaced-apart blocking members, and the pair of spaced-apart blocking members are movable toward and away from each other in a direction generally perpendicular to the longitudinal axis between respective first positions blocking insertion of the unleaded fuel nozzle into the filler neck past the blocking members and respective second positions allowing insertion of the diesel fuel nozzle into the filler neck past the blocking members.

14. The apparatus of claim 13, wherein the blocking members, when they are in their respective first positions, are separated by a distance smaller than an outer diameter of the unleaded fuel nozzle.

15. The apparatus of claim 13, wherein the at least one activator member comprises a pair of spaced-apart activator members coupled to the blocking members and movable toward and away from each other between their respective first positions and respective second position and the activator members are movable from their respective first positions to their respective second positions in a direction generally perpendicular to the longitudinal axis of the filler neck in response to the insertion of the diesel fuel nozzle into the filler neck to, in turn, move the blocking members to their respective second positions.

16. The apparatus of claim 15, wherein the activator members, when they are in their respective first positions, are separated by a distance smaller than an outer diameter of the diesel fuel nozzle and equal to or greater than an outer diameter of the unleaded fuel nozzle.

17. The apparatus of claim 15, wherein, when the unleaded fuel nozzle is inserted into a space provided between the activator members, a tip of the unleaded fuel nozzle is arranged to abut a small crescent-shaped nozzle-blocking surface on a first one of blocking members and a small crescent-shaped nozzle-blocking surface on a second one of the blocking members.

18. The apparatus of claim 15, further comprising a pair of spaced-apart springs interposed between the blocking members, wherein a first one of the activator members is located alongside a first one of the springs and coupled to left-side portions of the blocking members, and a second one of the activator members is located alongside a second one of the springs and coupled to right-side portions of the blocking members, and the springs bias the blocking members and the activator members to return to their respective first positions.

19. The apparatus of claim 1, wherein the at least one activator member is movable in a direction generally perpendicular to the longitudinal axis of the filler neck in response to the insertion of the large-diameter diesel fuel nozzle into the filler neck.

20. An apparatus comprising
a fill tube adapted to be coupled to a fuel tank of a motor vehicle having a diesel engine,
a pair of spaced-apart blocking members positioned in the fill tube and movable toward and away from each other between respective first positions blocking insertion of a small-diameter unleaded fuel nozzle into the fill tube and respective second positions allowing insertion of a large-diameter diesel fuel nozzle into the fill tube,
a pair of spaced-apart springs interposed between the blocking members to bias the blocking members to return to their respective first positions, and
a pair of spaced-apart activator members positioned in the fill tube, a first one of the activator members being located alongside a first one of the springs and coupled to left-side portions of the blocking members, a second one of the activator members being located alongside a second one of the springs and coupled to right-side portions of the blocking members, and the activator members being operable to move the blocking members to their respective second positions in response to the insertion of the large-diameter diesel fuel nozzle into the fill tube.

21. The apparatus of claim 20, wherein the fill tube includes a filler neck coupled the fuel tank and a filler neck closure assembly coupled to the filler neck, the filler neck closure assembly comprises a housing having an outer nozzle-receiving aperture normally closed by a pivotable outer door and an inner nozzle-receiving aperture normally closed by a pivotable inner door, and the blocking members, the activator members, and the springs are located in the filler neck closure assembly in positions between the pivotable outer door and the pivotable inner door.

22. The apparatus of claim 20, wherein the blocking members, when they are in their respective first positions, are separated by a distance smaller than an outer diameter of the unleaded fuel nozzle.

23. The apparatus of claim 20, wherein the blocking members, when they are in their respective second positions, are separated by a distance greater than an outer diameter of the diesel fuel nozzle.

24. The apparatus of claim 20, wherein the blocking members are movable in a direction generally perpendicular to a longitudinal axis of the fill tube between their respective first positions and respective second positions.

25. The apparatus of claim 20, wherein the activator members are movable from their respective first positions to their respective second positions in a direction generally perpendicular to the longitudinal axis of the fill tube in response to the insertion of the diesel fuel nozzle into the fill tube to, in turn, move the blocking members to their respective second positions.

26. The apparatus of claim 20, wherein the activator members, when they are in their respective first positions, are separated by a distance smaller than an outer diameter of the diesel fuel nozzle.

27. The apparatus of claim 20, wherein the activator members, when they are in their respective first positions, are separated by a distance greater than an outer diameter of the unleaded fuel nozzle.

28. An apparatus comprising
a fill tube adapted to be coupled to a fuel tank of a motor vehicle having a diesel engine,
first and second spaced-apart blocking members positioned in the fill tube and movable toward and away from each other in a direction generally perpendicular to a longitudinal axis of the fill tube between respective first positions blocking insertion of a small-diameter unleaded fuel nozzle into the fill tube and respective second positions allowing insertion of a large-diameter diesel fuel nozzle into the fill tube,
first and second spaced-apart activator members positioned in the fill tube, and
first and second wheel sets, the first wheel set including a first wheel mounted for rotation about a first axis and a second wheel mounted for rotation about a second axis parallel to the first axis, the first wheel carrying a third wheel that also rotates about the first axis, the first wheel mates with the first blocking member and the second wheel mates with the first activator member and the third wheel, the second wheel set including a fourth wheel mounted for rotation about a third axis and a fifth wheel mounted for rotation about a fourth axis parallel to the third axis, the fourth wheel carrying a sixth wheel that also rotates about the third axis, the fourth wheel mates with the second blocking member and the fifth wheel mates with the second activator member and the sixth wheel.

29. The apparatus of claim 28, wherein the first, second, third, fourth, fifth and sixth wheels comprise first, second, third, fourth, fifth and sixth gears, gear teeth on the first gear mesh with a toothed rack provided on the first blocking member, gear teeth on the second gear mesh with a toothed rack provided on the first activator member and gear teeth on the third gear, gear teeth on the fourth gear mesh with a toothed rack provided on the second blocking member, gear teeth on the fifth gear mesh with a toothed rack provided on the second activator member and gear teeth on the sixth gear.

30. The apparatus of claim 28, wherein frictional engagement is established between the first wheel and the first blocking member, between the second wheel and the first activator member and the third wheel, between the fourth wheel and the second blocking member and between the fifth wheel and the second activator member and the sixth wheel.

31. The apparatus of claim 28, further comprising first and second biasing springs, wherein the first biasing spring is interposed between the first activator member and the second blocking member, and the second biasing spring is interposed between the second activator member and the first blocking member, and the biasing springs yieldably bias the activator members and the blocking members to return to their respective first positions.

32. The apparatus of claim 28, wherein the blocking members are arranged to reduce the size of a nozzle entrance port bounded by the blocking and activator members to a size that is less than the size of the small-diameter unleaded fuel nozzle so that, when the small-diameter unleaded fuel nozzle is inserted into a space provided between first and second activator members, a tip of the small-diameter unleaded fuel nozzle is arranged to abut a small crescent-shaped nozzle-blocking surface on the first blocking member and a small crescent-shaped nozzle-blocking surface on second blocking member.

33. The apparatus of claim 28, wherein insertion of the large-diameter diesel fuel nozzle into a space provided between the two activator members causes activator members to move away from one another, and such movement of the activator members turns the second and fifth wheels, which, in turn, turn the first and fourth wheels to cause the blocking members to move away from one another to allow further insertion of the large-diameter diesel fuel nozzle past nozzle-blocking surfaces provided on the blocking members.

34. The apparatus of claim 28, wherein the movement of the activator members relative to the blocking members is defined by the gear ratio of first and second gears in each wheel set, and the gradient on cam ramps is responsible for the relation between the depth of insertion of large-diameter diesel fuel nozzle and the corresponding movement of the activator members and the blocking members.

35. An apparatus for preventing insertion of a small-diameter unleaded fuel nozzle into a filler neck of a fuel tank of a diesel motor vehicle while allowing insertion of a large-diameter diesel fuel nozzle into the filler neck, the apparatus comprising a filler neck closure assembly adapted to be coupled to the filler neck, at least one blocking member positioned to lie in the filler neck closure assembly and mounted for movement between a first position blocking insertion of the unleaded fuel nozzle into the filler neck past the at least one blocking member and a second position allowing insertion of the diesel fuel nozzle into the filler neck past the at least one blocking member, a spring biasing the at least one blocking member to the first position, and at least one activator member positioned to lie in the filler neck closure assembly and operable to move the at least one blocking member to the second position in response to the insertion of the diesel fuel nozzle, but not the unleaded fuel nozzle, into the filler neck.

* * * * *